Dec. 26, 1961 C. VAN DER LELY ETAL 3,014,334
SIDE DELIVERY RAKE
Original Filed June 4, 1953
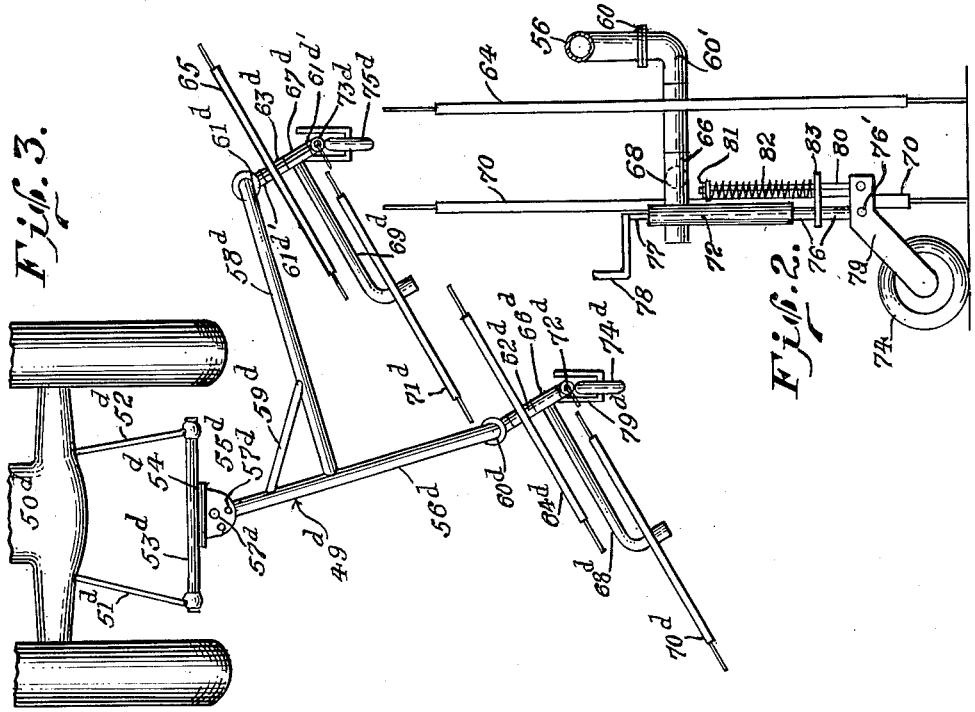
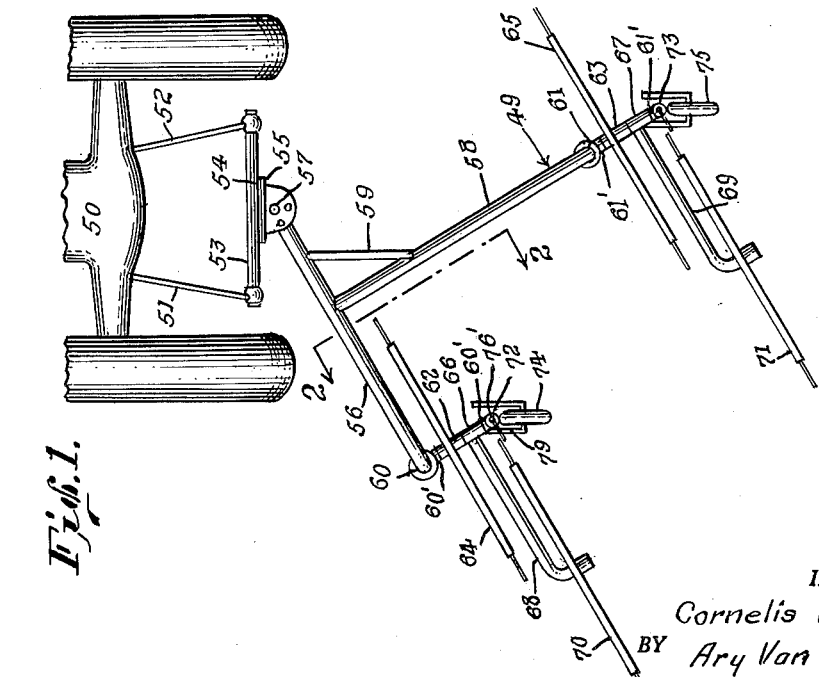
INVENTORS.
Cornelis Van der Lely
Ary Van der Lely.
BY
Mason, Mason & Albright
ATTORNEYS.

3,014,334
SIDE DELIVERY RAKE
Cornelis van der Lely and Ary van der Lely, Maasland, Netherlands, assignors to C. van der Lely N.V., Maasland, Netherlands, a limited company of the Netherlands
Original application June 4, 1953, Ser. No. 359,463, now Patent No. 2,904,950, dated Sept. 22, 1959. Divided and this application Aug. 4, 1959, Ser. No. 831,622
12 Claims. (Cl. 56—377)

This invention is a division of our application filed June 4, 1953, Serial No. 359,463, and now Patent No. 2,904,950 and relates to a raking device such as a side delivery rake or swath turner having rake wheels which are put into rotation by contact with the ground, the rake wheels being arranged at an angle to the direction of travel of the device.

An object of the invention is to provide a raking device of the above description in which the construction of the mobile frame carrying the rake wheels is simplified with a corresponding reduction in weight.

A further object of the invention is to provide the raking device with a support or supports, which are relatively small, light, carry a running wheel, and are resiliently mounted.

Further objects, features and details of the invention will appear from the following description with reference to the accompanying drawings in which an embodiment of the raking device according to the invention has been shown by way of example in which:

FIGURE 1 shows a plan view of a side delivery rake and swath turner which is combined with a tractor;

FIGURE 2 is a side elevation of a running wheel used in the machine according to FIGURE 1; and FIGURE 3 is a plan view of the machine according to FIGURE 1 shown in the side delivery position indicated by the dotted lines in FIGURE 1.

The device shown in FIGURE 1 comprises a tractor 50 which is combined with a side delivery rake and a swath turner. The position of the machine as a swath turner is indicated in FIGURE 1 by the full lines. The side delivery position is shown in FIGURE 3. The parts in FIGURE 3 have been identified by the same numbers as in FIGURE 1, with the addition of a "d" to the reference numerals.

The tractor 50 carries a number of rearwardly extending lift bars such as rods 51 and 52, the ends of which are interconnected by a laterally arranged rod-like member constituting rod 53, which, as will be seen, constitutes a pivot means for the raking attachment interconnected thereto. In the center portion of rod 53 is a coupling, of which parts 54 and 55 are rotatable with respect to each other, about an axis parallel with the longitudinal axis of the tractor, as shown in Patent No. 2,446,584. Part 54 is fixed to rod 53. A first frame part comprising tube 56 is hingedly connected at hinge 57 to part 55. The longitudinal axis of hinge 57 is substantially vertical. Tube 56 may be fixed in respect to its angular position with part 55 by means of pin 57' in any one of a number of positions. Means of this nature for securing angular position are well known to the art as exemplified by Patents Nos. 1,362,154, 1,490,758, 1,701,107, and 2,577,145. To the tube 56 is welded a second frame part comprising tube 58, and the angular position of tubes 56 and 58 is secured by strut 59. Tubes 56 and 58 together with the associated strut 59 comprise frame 49. The free ends 60 and 61 of tubes 56 and 58 are bent vertically downward and carry axles constituting short extensions 60' and 61', one of which, 60', is shown in FIGURE 2, which are rotatable about vertical axes and may be locked in position by a pin, not shown, that will prevent relative rotation of parts 60 and 60', as shown in Patent No. 2,447,354. The hubs, 62 and 63, of the rake wheels 64 and 65, as well as bushings 66 and 67 are rotatable about said extensions 60' and 61'. Said bushings 66 and 67 carry cranks, 68 and 69, and the rake wheels 70 and 71 are rotatably mounted upon the crank pins of said cranks.

The extensions of 60' and 61' carry at their ends vertical tubes 72 and 73, each forming part of the support structure for their respective running wheels 74 and 75. This is more clearly shown in FIGURE 2, which illustrates the support structure for running wheel 74. In the figure are shown the extension 60', the vertical tube 72 and rod 76 rotatable therein, and abutting at the top against the bottom end of the threaded rod 77. This threaded rod 77 may be screwed upwards and downwards within the upper part of tube 72 by means of handle 78, thus adjusting the height of extension 60' above the ground. Running wheel 74 runs in a fork 79 which is pivotally connected on the bottom portion of rod 76 by means of a horizontal pivot 76'. To fork 79 is also hingedly connected the bottom portion of a rod 80 which is arranged parallel to rod 76. The upper portion of rod 80 has an adjustable nut 81 which holds a helical spring 82 between said nut 81 and a plate 83 rigidly connected to rod 76. Rod 80 extends through an opening in plate 83. When the wheel 74 is pushed upwards, whereby fork 79 turns in a clockwise direction, as viewed in FIGURE 2, about the pivot on rod 76, spring 82 is compressed by rod 80 being pulled downward, and the desired supporting resiliency is thereby obtained. Rod 76 is rotatable in tube 72 and the running wheel 74 is thus self-adjusting in the manner of a conventional coaster. The running wheel 75 is connected to the tube 73 in the same way as running wheel 74 is to tube 72.

For transport, the swath turner or side delivery rake as the case may be, is lifted integrally from the ground. As will be understood by those skilled in the art, parts 54 and 55 and rod 53 may be secured against rotation as rods 51 and 52, which constitute lift means, are moved upwards. In this connection, any suitable means known to those skilled in the art may be employed to secure parts 54 and 55 and rod 53 against rotation. Thus, for example purposes only, means for securing a part similar to rod 53 against rotation is disclosed in Patent No. 2,446,584, and parts 54 and 55 may be secured by clamps such as shown in Patents Nos. 2,241,089 and 2,640,717, or a jack as disclosed in Patent No. 864,166. In reference to Patent No. 2,446,584, it will be noted that the lifting means therein employed is equivalent to the lifting means for the raking attachment in this invention.

The above descriptions and drawings disclose a single embodiment of the invention and specific language has been employed in describing the figures. It will, nevertheless, be understood that no limitations of the scope of the invention are thereby contemplated, and that various alterations and modifications may be made and equivalents employed such as would occur to one skilled in the art to which the invention relates.

We claim:

1. A raking attachment for combination with a tractor provided with draft means and lift means for lifting said raking attachment, said raking attachment comprising a frame having at least two rigidly associated frame parts, the rigid association of said frame parts being a rigid connection at substantially right angles, axles mounted on each of said frame parts, rake wheels journalled on said axles, and coupling means connecting said frame to said lifting device of said tractor, said coupling means enabling rotation of said frame about an axis extending substantially in the direction of movement of the tractor and rake.

2. A raking attachment according to claim 1 having at least one running wheel interconnected to each of said frame parts.

3. A raking attachment according to claim 1 having hinge means associated with said coupling means, said hinge means enabling rotation of said frame with respect to said coupling means about a substantially vertical axis.

4. A raking attachment according to claim 1 having pivot means associated with said coupling means, said pivot means enabling rotation of said frame with respect to said tractor draft and lift means about a substantially horizontal axis.

5. A raking attachment for combination with a tractor provided with draft means and lift means for lifting said raking attachment, said raking attachment comprising a frame having at least two rigidly associated frame parts, the rigid association of said frame parts being a rigid connection at substantially right angles, axles mounted on each of said frame parts, rake wheels journalled on said axles, coupling means connecting said frame to said lifting device, and pivot means and hinge means associated with said coupling means whereby said frame may move in a vertical arc in respect to said pivot means and in a horizontal arc with respect to said hinge means.

6. A raking attachment for a tractor provided with draft means and lift means, said raking attachment comprising a coupling means for connection to said lift means, hinge means rotatably attached to said coupling means, a frame having a frame part fixedly connected to said hinge means and a second frame part fixedly connected at substantially right angles to said first-mentioned frame part, two frame extensions of said frame, the first of said extensions being pivotally interconnected to said first-mentioned frame part opposite said coupling means so that it may be selectively pivoted in a horizontal arc, the second of said extensions being pivotally interconnected to said second frame part opposite its connections to said first-mentioned frame part so that it may be selectively pivoted in a horizontal arc, at least two overlapping rotatable rake wheels connected to each of said extensions, and two running wheels interconnected to said frame, said running wheels together with said tractor providing support for said raking attachment.

7. A raking attachment for a tractor provided with draft means and lift means, said raking attachment comprising coupling means for connection to said lift means, hinge means rotatably connected to said coupling means, securing means cooperating with said coupling means and said hinge means and securing said hinge means against rotation on said coupling means, a first frame part connected to said hinge means, a second securing means for securing the angular position of said first frame part with respect to said coupling means, a second frame part rigidly connected at substantially right angles to said first frame part, two frame extensions, the first of said extensions being selectively pivotally connected to said first frame part opposite said coupling means, the second of said extensions being selectively pivotally connected to said second frame part opposite its connection to said first frame part, at least two overlapping rotatable rake wheels connected to each of said extensions, and at least one running wheel connected to each of said extensions, said running wheels together with said tractor providing support for said raking attachment.

8. A side delivery rake for laterally displacing material on the ground comprising a frame having thereon an echelon of rake wheels, said frame being substantially rigid and having a forwardly and laterally extending portion, said portion having a laterally arranged rod-like member comprising pivot means adapted to have pivotal connection with lift bars of a tractor, to permit said rake frame to have pivotal movement with respect to said tractor.

9. A side delivery rake for combination with a tractor provided with rearwardly extending bars comprising a frame having at least two rigidly associated frame parts, one of said frame parts extending forwardly and laterally, a coupling means attached to said latter-mentioned frame part at its forward portion, a laterally arranged rod-like member comprising pivot means attached to said coupling means, said rod-like member comprising pivot means adapted to have pivotal connections with said lift bars, said coupling means maintaining the angular relationship between said tractor and said frame substantially constant, and a laterally forwardly extending echelon of rake wheels mounted on said frame.

10. A side delivery rake for combination with a tractor with rearwardly extending lift bars comprising a frame having thereon an echelon of rake wheels, said frame being substantially rigid and having a forwardly and laterally extending portion, a laterally arranged rod-like member comprising pivot means adapted to have pivotal connection with said lift bars, hinge means rotatably connected to said coupling means, securing means cooperating with said coupling means and said hinge means to permit securing said hinge means against rotation on said coupling means, said forwardly and laterally extending frame portion connected to said hinge means, and a second securing means for securing the angular relationship of said frame portion with respect to said coupling means and rod-like member.

11. A side delivery rake for laterally displacing hay or other material on the ground for combination with a tractor with rear lift bars comprising a frame having thereon an echelon of rake wheels, said echelon disposed forwardly and laterally in respect to the normal direction of travel of said tractor, said frame being substantially rigid and having a forwardly and laterally extending portion, said portion having a laterally arranged rod-like member comprising pivot means adapted to have pivotal connection with said lift bars, to permit said frame to have pivotal movement with respect to said tractor.

12. A side delivery rake for combination with a tractor having a draft hitch including rearwardly extending lift bars, comprising a frame, said frame being substantially rigid and having a forwardly and laterally extending portion, a laterally arranged rod-like member comprising pivot means adapted to have pivotal connection with said lift bars, coupling means connected to said rod-like member, hinge means connected to said coupling means, said forwardly and laterally extending frame portion connected to said hinge means, securing means for securing the angular relationship of said frame portion with respect to said coupling means and rod-like member, two frame extensions, each of said extensions being selectively pivotally connected to said frame, at least two overlapping rotatable rake wheels connected to each of said extensions, said rake wheels being in echelon, and at least one running wheel connected to each of said extensions, said running wheels together with said tractor providing support for said raking attachment.

References Cited in the file of this patent
UNITED STATES PATENTS

| | | |
|---|---|---|
| 2,459,961 | Pollard | Jan. 25, 1949 |
| 2,472,260 | Morrill | June 7, 1949 |
| 2,657,519 | Hill | Nov. 3, 1953 |
| 2,658,324 | Johnson | Nov. 10, 1953 |